Nov. 14, 1950  D. ARMSTRONG  2,530,321
X-RAY CASSETTE
Filed Oct. 5, 1945
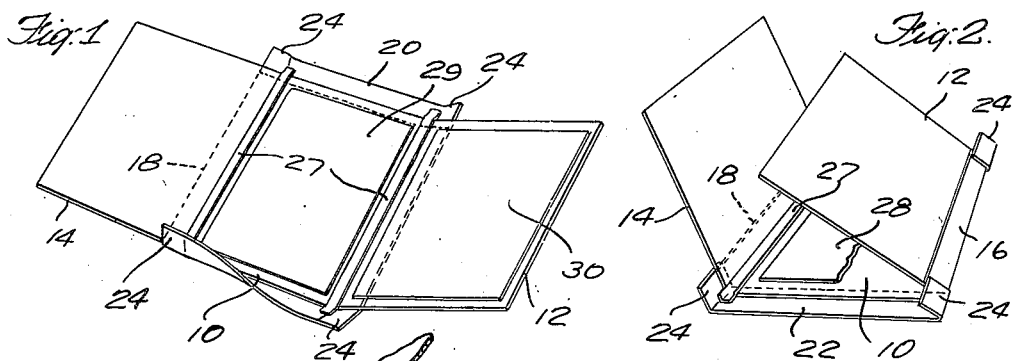
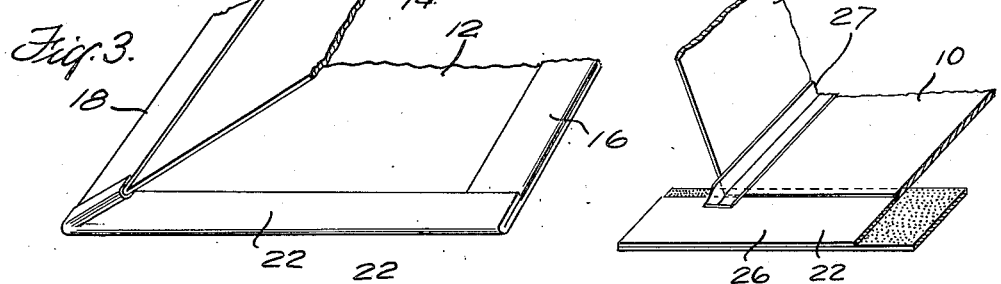
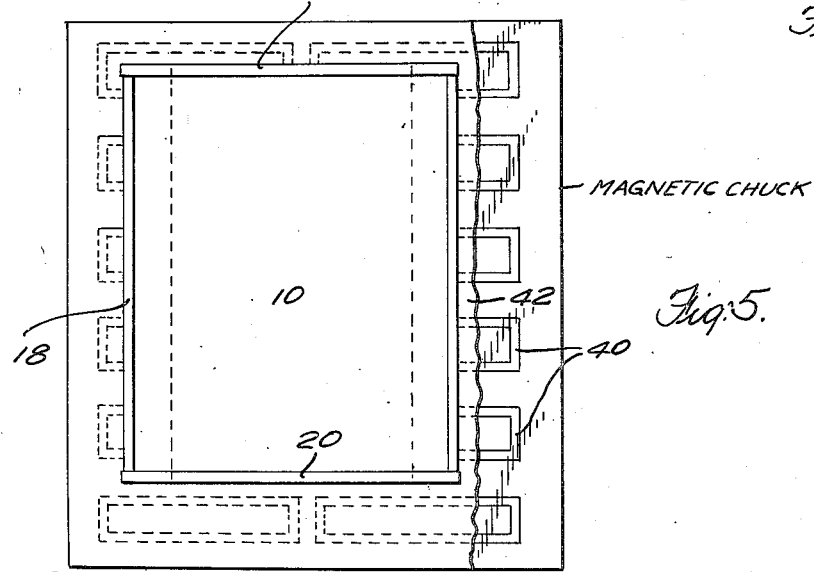
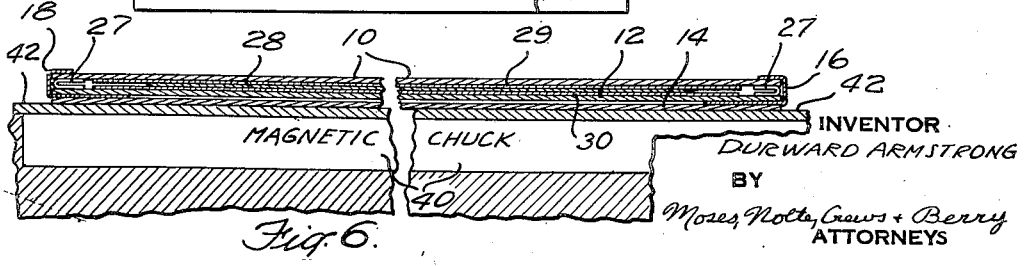
INVENTOR
DURWARD ARMSTRONG
BY
Moses, Nolte, Crews & Berry
ATTORNEYS Patented Nov. 14, 1950

2,530,321

UNITED STATES PATENT OFFICE 2,530,321

X-RAY CASSETTE

Durward Armstrong, Northport, N. Y.

Application October 5, 1945, Serial No. 620,489

2 Claims. (Cl. 250—68)

This invention relates to X-ray cassettes for holding sensitized film when taking X-ray photographs. While the cassette of the present invention may be used for taking medical photographs, it is more particularly adapted for industrial X-ray work. In industrial radiography the exposures are usually of an entirely different order from those taken of medical subjects. Where heavy sections have to be photographed, exposures under rays of higher intensity and of much longer duration are required than are used for medical photographs, and these conditions produce effects due to back scatter and similar causes, which are much more serious than in the case of exposures of weaker intensity and shorter duration. For this reason the cassettes which are commonly used in medical technique prove to be unsatisfactory for industrial radiography.

Many of the cassettes in common use are provided with backs held in place by springs or levers or other fasteners which take up considerable space, and which therefore hold the sensitized film in the cassette spaced a considerable distance from the lead table from which the photographs are usually taken. As the back scatter is proportional to the distance between the film and the lead table, there will be serious effects from back scatter unless a heavy lead screen is incorporated in the cassette itself directly adjacent to the film. The incorporation of a heavy enough screen in the cassette to make it independent of its position with respect to the table would make the cassette expensive and so heavy as to be impractical for production work.

In accordance with the present invention a cassette is provided of minimum thickness and in which the back or table side is thin and flat and of uniform thickness and material. The flatness of the table side enables the film contained in the cassette to be brought uniformly close to the table so as to reduce back scatter to a minimum. Furthermore as there are no auxiliary parts such as springs and fasteners between the film and the table there is no danger of images of such parts being formed on the film, due to secondary radiation. As the film is brought so close to the table only a minimum of thickness of lead screen needs to be incorporated into the cassette.

With the foregoing consideration in mind a primary object of the present invention is to provide a cassette having a table side component of minimum thickness and uniform character so as to minimize the effects of back scatter.

It is also an object of the invention to provide a cassette which is light, very simple in construction, inexpensive to make, and very simple to use.

It is also an object of the invention to provide a cassette which is of such sturdy construction that the heaviest parts to be radiographed may be rested thereon without injury to the cassette or to the sensitized film contained therein.

A further object of certain forms of the improved cassette is to provide a construction having the tube side highly permeable to X-rays, and which may be used for taking radiographs of very light sections, such as spot welded sheet metal parts.

In the accompanying drawing certain preferred embodiments of the invention are shown for the purpose of illustrating the principle thereof. It will be understood that changes may be made in the detail of these embodiments without departing from the scope and spirit of the invention.

In the drawings:

Figure 1 is a perspective view of one form of the cassette open ready to receive the film;

Figure 2 is a perspective view of the cassette with both parts of the table side component partly open;

Figure 3 is a fragmentary perspective view of the cassette with the first table side component closed and the cover almost closed;

Figure 4 is a fragmentary view showing the construction of the flexible hinges of the cassette;

Figure 5 is a plan view showing a cassette having parts made of steel or iron plates, and mounted on a table incorporating a magnetic chuck;

Figure 6 is a view showing a closed cassette on the table, the cassette being shown in transverse section.

Referring to the form of cassette shown in Figure 1, this comprises three metal plates joined together by flexible hinges. The middle plate 10 constitutes the tube side of the cassette. This plate can be made of any suitable material, preferably aluminum or Duralumin, which is readily permeable by X-rays, and which is also strong so that it can directly support heavy castings or other parts to be radiographed. Hinged to one side of the plate 10 is a table side plate 12 which is of metal of uniform thickness and may be aluminum, Duralumin, copper, steel or other suitable metal. The third plate 14 is the cover plate which may be of metal similar to plate 12.

The plates 10, 12 and 14 are joined by strips of flexible material 16, 18 constituting flexible hinges. These flexible strips can be of any desired material, and secured to the plates in any convenient manner. I preferred to make the strips of heavy adhesive tape preferably having a cloth base. For sealing the ends of the cassette against the entrance of light, I prefer to use two other strips of flexible material 20 and 22. These strips may also be made of heavy adhesive, preferably with a cloth back. The edges of the strips are caused to adhere to the ends of the front side of the tube side plate 10, and the strips 20 and 22 are somewhat longer than the edges of the plate to which they are attached, so that they project to form foldable tabs 24. The projecting parts of the strips 20 and 22, including the tabs 24 are made non-adhesive in any suitable manner. This may be done by making a strip which is partly adhesive and partly not covered with adhesive, but it is more convenient to use an adhesive tape for the entire strip and then cover the exposed part of the strip with a non-adhesive cover, for instance, black paper, such covering being indicated at 26. This permits the free edges of the strips 20 and 22 to be folded over without adhering to whatever they come in contact with. If the hinge strips 16, 18 are of adhesive material cover strips 27 of some thin adhesive material such as adhesive coated cellophane tape are preferably placed over the hinge joints on the inside so as to cover the exposed portions of the hinge strip between the edges of the plates. This prevents the film from possibly sticking to exposed adhesive portion of the hinge strips.

In use the cassette is opened up as shown in Figure 1, and then sealing strips 20 and 22 are flattened out. The sensitized film 28 either with or without the usual paper covering is then placed on the tube side plate, and the table side plate 12 is then folded over upon the film, the sealing strips 20 and 22 still projecting. At this point, as indicated in Figure 2, it will be seen that the corner tabs 24 projecting adjacent to the plate 12, are folded over upon the bodies of strips 20 and 22. The strips 20 and 22 are now folded inwardly, as indicated in Figure 3, and the cover plate 14 is now folded down, which results in folding over the corner tabs 24 adjacent to the plate 14 and pressing the sealing strip down between the plates 12 and 14. This produces a light tight seal. The closed cassette can now be readily handled, as the cover lies firmly over the whole back of the cassette which can be grasped and picked up like a thin book or folder, without danger of coming open as long as it is grasped and handled with ordinary care. When laid on the table it lies flat without auxiliary fastening means, although any suitable fastener may be used if desired. As the cassette itself is light-tight the use of a paper covering for the film is unnecessary and such a covering should be omitted for heavy exposures because it would be a source of secondary radiation. As shown in the drawing, no paper covering is employed but the film is laid directly in the cassette.

The tube side of the cassette, as will be seen, consists of a single metal plate of uniform thickness and the table side component comprises two overlapping plates, each covering the whole back of the film, and each of uniform thickness. It is obvious that while each plate is preferably of uniform thickness throughout the several plates do not all have to be of the same thickness or material.

If desired, an intensifying screen of any desired type may be placed between the tube side plate and the film, as indicated at 29. In some instances the tube side plate may be electroplated with lead. A lead sheet or intensifying screen of suitable nature, of uniform thickness, may be placed between the film and the table side plate 12 as indicated at 30 but as the cassette lies very flat on the table, this screen usually can be made very thin. For convenience it is generally desirable to attach the screen to the inside of the plate 12, which may be done by cementing it thereon or otherwise. It is also possible to electroplate the inside of plate 12 with lead to a desired thickness. This gives a minimum thickness to the plate and lead screen and further accomplishes the result of bringing the film close to the lead table. Owing to the fact that the plates constituting the walls of the cassette are hinged together with flexible hinges, the cassette can accommodate intensifying or lead screens of varying thicknesses. Furthermore, whatever the thickness of the screens which may be used the cassette will nevertheless flatten itself out so as to have the minimum thickness compatible with the thickness of the screens and film. The screens will necessarily lie as close to the film as possible, and all parts will lie close to the table without the presence of any unnecessary air spaces. As a result, back scatter effects are reduced to a minimum.

It will be particularly noted that the cassette contains no felt liners or pads or extraneous materials of any kind except the intensifying screens, if used, and the lead coating or sheet. The metal plates of which the cassette are made are thin and flat and with the film interposed between these plates, with only the necessary screens, secondary radiation or back-scatter effects can be absolutely controlled. As the table side plate or plates are thin, a thin lead sheet can be used on the table side of the film to prevent such slight back-scatter as would result from the thin table side plates. The film rests directly on the lead so that there is no intervening layer to produce an uncontrolled back-scatter effect.

As the plates are usually of metal and lie one upon another with only the film and any intensifying or lead screens interposed, heavy weights can be placed on the cassette without injuring the same. Thus the cassette is suitable for work with massive castings or the like.

For some purposes where very light sections are to be photographed, the tube side plate instead of being made of metal may be made of plastic such as heavy cellulose acetate film which has been coated or treated in such a way as to make it opaque to light rays. Such a cassette is like that shown in Figure 4, all parts being the same except as to the material of the tube side plate. Such a cassette is useful for photographing very light sections such as sheet metal sections in which it is desired to examine spot welds.

In some cases it may be desirable to clamp the cassette firmly down so as to hold the parts as closely together as possible, and to flatten out the film while in the cassette and positively maintain it in a plane surface. This may be accomplished by the construction shown in Figures 5 and 6 in which one or more of the components of the cassette are made of steel or other magnetic material. As shown, the tube side plate of the cassette is made of steel. The cassette is placed on a table incorporating a magnetic chuck indicated at 40. The face of the chuck is preferably covered with a lead plate 42. The cassette is placed on the table and the power turned on to the chuck. The magnetic flux then draws the steel tube side plate firmly down, thus holding the same against the film and drawing all parts of the cassette firmly down upon the table. Very excellent results can be obtained by this arrangement. Upon turning the power off the chuck, the cassette can be removed and handled as usual.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principles may be utilized.

I claim:

1. An X-ray cassette comprising a flat sheet tube side and a flat sheet metal table side and a lead screen inside of said table side and in intimate contact therewith, said tube side and table side being connected in such manner as to form a light-tight chamber, said lead screen constituting the supporting surface for a film placed in the cassette, said cassette containing no interposed layer capable of causing back-scatter between the film and the lead screen, said lead screen being of sufficient thickness to substantially eliminate any back-scatter effects due to secondary radiation from the table side wall of the cassette.

2. An X-ray cassette as claimed in claim 1 in which the lead screen comprises a layer of lead electroplated on the inner surface of the table side plate of the cassette.

DURWARD ARMSTRONG.

REFERENCES CITED

The following references are of record in the file of this patent:

UNITED STATES PATENTS

| Number | Name | Date |
|---|---|---|
| 653,383 | Gates | July 10, 1900 |
| 949,351 | Clayton | Feb. 15, 1910 |
| 1,352,615 | MacLagan | Sept. 14, 1920 |
| 1,367,601 | Hodgson | Feb. 8, 1921 |
| 1,521,500 | Becker et al. | Dec. 30, 1924 |
| 1,536,345 | Jones et al. | May 5, 1925 |
| 1,933,652 | Boldingh | Nov. 7, 1933 |
| 2,126,769 | Goldschmidt | Aug. 16, 1938 |
| 2,143,799 | Schonander et al. | Jan. 10, 1939 |
| 2,306,194 | Swaisgood | Dec. 22, 1942 |

FOREIGN PATENTS

| Number | Country | Date |
|---|---|---|
| 483,314 | Great Britain | Apr. 19, 1938 |

OTHER REFERENCES

Pub. 7E, 362 General Electric X-Ray Corp., page 2.